US012722428B2

(12) United States Patent
Takagi et al.

(10) Patent No.: US 12,722,428 B2
(45) Date of Patent: Sep. 1, 2026

(54) TIRE

(71) Applicant: Toyo Tire Corporation, Itami (JP)

(72) Inventors: Yuki Takagi, Itami (JP); Shota Yanahara, Itami (JP)

(73) Assignee: Toyo Tire Corporation, Itami (JP)

(*) Notice: Subject to any disclaimer, the term of this patent is extended or adjusted under 35 U.S.C. 154(b) by 0 days.

(21) Appl. No.: 18/980,268

(22) Filed: Dec. 13, 2024

(65) Prior Publication Data

US 2025/0214380 A1 Jul. 3, 2025

(30) Foreign Application Priority Data

Dec. 27, 2023 (JP) ................................ 2023-220979

(51) Int. Cl.
*B60C 13/00* (2006.01)

(52) U.S. Cl.
CPC ................................ *B60C 13/001* (2013.01)

(58) Field of Classification Search
CPC ................................ B60C 13/001
See application file for complete search history.

(56) References Cited

U.S. PATENT DOCUMENTS

D43,311 S * 12/1912 Lohmann .................... D12/605
D735,655 S * 8/2015 Frappart .................... D12/605
D735,656 S * 8/2015 Seii .................... D12/605
2018/0141390 A1* 5/2018 Miyasaka ............ B60C 13/001
2019/0023081 A1 1/2019 Iwabuchi et al.
2019/0047331 A1* 2/2019 Iwabuchi ............ B60C 13/02
2021/0107320 A1 4/2021 Li et al.

FOREIGN PATENT DOCUMENTS

JP 2016215704 A * 12/2016
JP 2017001440 A 1/2017
WO WO-2015018763 A1 * 2/2015 .......... B60C 13/001
WO 2016182076 A1 11/2016
WO 2017130986 A1 8/2017
WO 2017131091 A1 8/2017
WO 2019174347 A1 9/2019

OTHER PUBLICATIONS

Extended Search Report issued on May 13, 2025, in corresponding European Application No. 24219448.8, 9 pages.

* cited by examiner

*Primary Examiner* — Robert C Dye
(74) *Attorney, Agent, or Firm* — Maier & Maier, PLLC

(57) ABSTRACT

A tire including a pattern region on an outer surface of a sidewall of the tire, the pattern region being visually recognizable as being different from a region other than the pattern region in the outer surface of the side wall of the tire; and a plurality of character protrusions separate from each other in the pattern region. The character protrusions each imitate a character or a rotated or inverted character. Regions each of which has a shape of a parallelogram circumscribed to a contour of a respective one of the character protrusions and is set to have a minimum area are defined as character protrusion regions, and the character protrusion regions of adjacent ones of the character protrusions partially overlap with each other.

13 Claims, 18 Drawing Sheets

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | COMPARATIVE EXAMPLE |
|---|---|---|---|---|---|---|---|---|---|
| PROTRUSION SHAPE | CHARACTER PROTRUSION | | | | | | | | SIMPLE PROTRUSION (CONE) |
| PROTRUDING HEIGHT H (mm) | 1.0 | 0.5 | 1.0 | 0.5 | 1.0 | 1.0 | 0.1 | 0.5 | 1.0 |
| DIMENSION OF CHARACTER PROTRUSION (D/W) (mm) | 1.0/2.0 | 0.5/1.0 | 0.5/1.0 | 0.1/0.2 | 1.0/2.0 | 2.5/5.0 | 1.0/2.0 | 1.0/2.0 | BOTTOM DIAMETER 1.0 |
| MINIMUM DISTANCE S (mm) | 0.1 | 0.1 | 0.3 | 0.1 | 0.3 | 1.0 | 0.1 | 1.0 | 1.0 |
| EVALUATION ON BLACK COLOR | HIGH | HIGH | HIGH | HIGH | HIGH | MODERATE | MODERATE | MODERATE | LOW |

7
7b
110
R110
120
R120
110
R110
R110
110
R120
120
R110
110

TIRE

CROSS-REFERENCE TO RELATED APPLICATIONS

This application is based on and claims the benefit of priority from Japanese Patent Application No. 2023-220979, filed on 27 Dec. 2023, the content of which is incorporated herein by reference.

FIELD

The present disclosure relates to a tire having, on a part of an outer surface of a sidewall, a pattern region for displaying, for example, a mark, a pattern, and the like.

BACKGROUND

There is a known tire having, on a part of a sidewall, a pattern region in which a large number of fine protrusions are aggregated (for example, Japanese Unexamined Patent Application, Publication No. 2017-1440). Such a pattern region, in which incident light is repeatedly reflected between the protrusions, has a light-absorbing effect, and consequently, the pattern region is visually recognized to be blacker than the outer surface of the sidewall around the pattern region, whereby the contrast is enhanced. Provision of this type of pattern region contributes to improving the design effect and appearance of the tire.

SUMMARY

The high contrast obtained by a large number of protrusions has an advantage that it is less susceptible to changes due to aging than contrast obtained by other means such as painting or the like, and its effect is exerted over a long period of time. Therefore, there is a demand for formation of a pattern region including protrusions, having a higher black color intensity and a higher contrast than the known art, and contributing to further improvement of the design effect and the appearance.

It is an object of the present disclosure to provide a tire having a higher black color intensity and a higher contrast than the known art.

A tire according to the present disclosure includes: a pattern region on an outer surface of a sidewall of the tire, the pattern region being visually recognizable as being different from a region other than the pattern region in the outer surface of the sidewall of the tire; and a plurality of character protrusions separate from each other in the pattern region. The character protrusions each imitate a character or a rotated or inverted character. Regions each of which has a shape of a parallelogram circumscribed to a contour of a respective one of the character protrusions and is set to have a minimum area are defined as character protrusion regions, and the character protrusion regions of adjacent ones of the character protrusions partially overlap with each other.

The present disclosure provides a tire having a higher black color intensity and a higher contrast than the known art.

BRIEF DESCRIPTION OF THE DRAWINGS

FIG. 6 is a table showing evaluation results;

DETAILED DESCRIPTION OF THE EMBODIMENTS

Embodiments in which the present disclosure can be worked will be described below with reference to the drawings, etc.

First Embodiment

Figure 1:
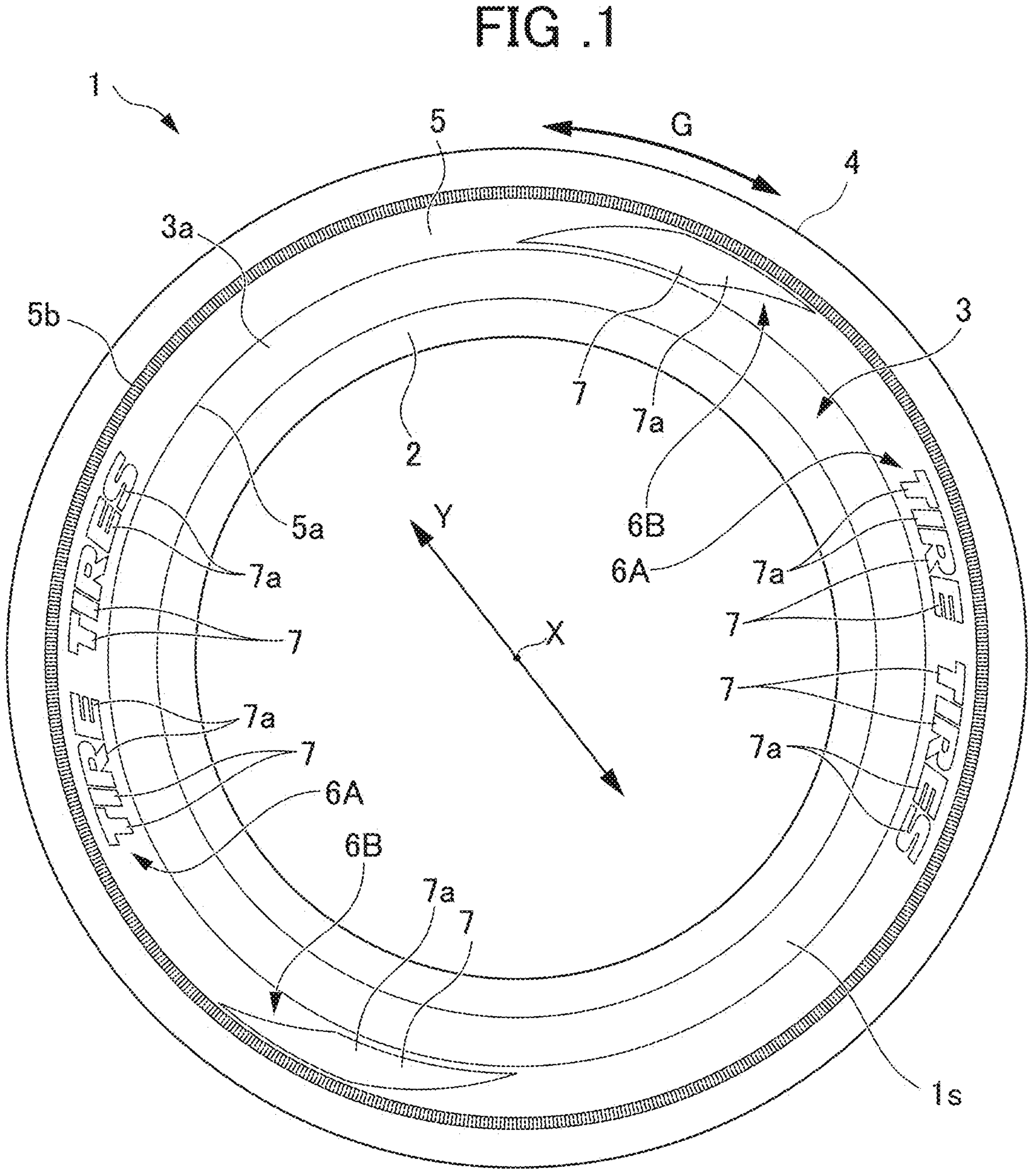
FIG. 1 is a side view of a tire 1 according to a first embodiment.

A first embodiment will be described with reference to the drawings. FIG. 1 is a side view of a tire 1 according to the first embodiment. The tire 1 is a so-called pneumatic tire that has an inner cavity filled with air at a predetermined pressure. The tire 1 of the embodiment is a pneumatic tire for passenger cars including light automobiles, SUVs, and the like. The configuration of the tire 1 of the embodiment can also be applied to pneumatic tires for other types of vehicles such as light trucks, trucks, and buses.

First, with reference to FIG. 1, an overview of a configuration mainly related to a side surface of the tire 1 will be described. FIG. 1 is a side view of the tire 1 viewed in the direction of a tire rotation axis X. The following description will be provided by referring to a tire axial direction, a tire circumferential direction, and a tire radial direction, which are as follows. The tire axial direction refers to a direction in which the tire rotation axis X extends, and corresponds to a front-back direction of the page of FIG. 1. The tire axial direction coincides with the left-right direction when the tire 1 is viewed in the tire radial direction, and therefore, the tire axial direction may be referred to as the left-right direction. The tire circumferential direction can be represented by an arc line centered on the tire rotation axis X, is a direction along the rotation direction of the tire 1, and is indicated by the arrow G in FIG. 1. The tire radial direction is a direction perpendicular to the tire rotation axis X, and is arbitrarily indicated by the arrow Y in FIG. 1.

As illustrated in FIG. 1, the tire 1 includes beads 2, sidewalls 3 that continue from the beads 2 and extend outward in the tire radial direction away from the tire rotation axis X, and a tread 4. One bead 2 and one sidewall 3 are provided on one side 1*s* of tire 1 illustrated in FIG. 1, and one bead 2 and one sidewall 3 are provided on the other side of the tire 1 spaced apart in the tire axial direction from the side 1*s* and not illustrated in FIG. 1. That is, the tire 1 includes the left and right beads 2 in pairs and the left and right sidewalls 3 in pairs. The tread 4 is disposed between the outer sides in the tire radial direction of the left and right sidewalls 3. The outer peripheral surface of the tread 4 includes a tread surface that contacts with a road surface.

The tire 1 is mainly composed of a plurality of types of rubbers respectively constituting the beads 2, the sidewalls 3, and the tread 4. A carcass ply that constitutes the skeleton of the tire 1 is disposed on an inner cavity-facing side of the rubber constituting the entire tire 1, and an inner liner that maintains an air pressure is disposed on an inner cavity-facing side of the carcass ply. An annular reinforcing belt is embedded in the rubber constituting the tread 4. The carcass ply, the inner liner, and the reinforcing belt are not illustrated. In addition to the foregoing components, various components are included as necessary in consideration of the function of the tire 1.

As illustrated in FIG. 1, the sidewall 3 has an outer surface 3*a* and an annular decorative region 5 extending on the outer surface 3*a* over the entire circumference in the tire circumferential direction. The decorative region 5 has a constant width and is defined between an inner arc line 5*a* and an outer arc line 5*b*. The inner arc line 5*a* is located inward in the tire radial direction and close to the tire rotation axis X in the tire radial direction, and the outer arc line 5*b* is located outward in the tire radial direction with respect to the inner arc line 5*a*. Each of the inner arc line 5*a* and the outer arc line 5*b* may be a line formed as a concavity, a convexity, or a step on the outer surface 3*a* of the sidewall 3, or may be a virtual line that does not actually exist.

On the outer surface 3*a* of the sidewall 3, the position of the decorative region 5 may be outside in the tire radial direction with respect to the position of a tire maximum width, or may be at a location including the position of the tire maximum width. The position of the tire maximum width refers to a position at which a length in the tire axial direction is maximized between the outer surfaces 3*a* of the left and right sidewalls 3.

The tire 1 includes pattern regions 7 on parts of the outer surface 3*a* of the sidewall 3. Each pattern region 7 is visually recognizable as being different from the region other than pattern region 7 in the outer surface 3*a* of the sidewall 3 of the tire 1. Each pattern region 7 is provided on a sidewall rubber that is a black rubber member constituting the outer surface 3*a* of the sidewall 3.

As illustrated in FIG. 1, mark portions 6A are provided on the annular decorative region 5 at two positions opposite to each other across the tire rotation axis X. Each mark portion 6A includes a plurality of characters arranged in the tire circumferential direction. By means of the plurality of characters, at least one of a manufacturer name, a product name, a brand mark, or the like is displayed. Each character may be bordered with a concave or convex line, or the entirety of each character may be formed of a concavity or convexity. For example, the characters of the mark portions 6A are provided as the pattern regions 7 of the embodiment.

As illustrated in FIG. 1, motif portions 6B are provided on the annular decorative region 5 at two positions each of which is sandwiched between the two mark portions 6A in the circumferential direction. Each motif portion 6B includes a motif like a parallelogram curved along the annular decorative region 5. For example, the motifs of the motif portions 6B are also provided as the pattern regions 7 of the embodiment.

It should be noted that the shapes of the pattern regions 7 are not limited to the foregoing shapes, and various shapes may be adopted, examples of which include an arbitrary shape, shapes delineating the above-mentioned manufacturer name, product name, brand mark, etc., and shapes delineating other numerals, characters, etc.

Each of the pattern regions 7 of the embodiment has a surface 7*a* extending along the profile of the sidewall 3. Each surface 7*a* has a plurality of character protrusions 110 (to be described later) formed thereon. Due to the plurality of character protrusions 110, each pattern region 7 is visually recognizable as being different from the region other than pattern region 7.

Figure 2:
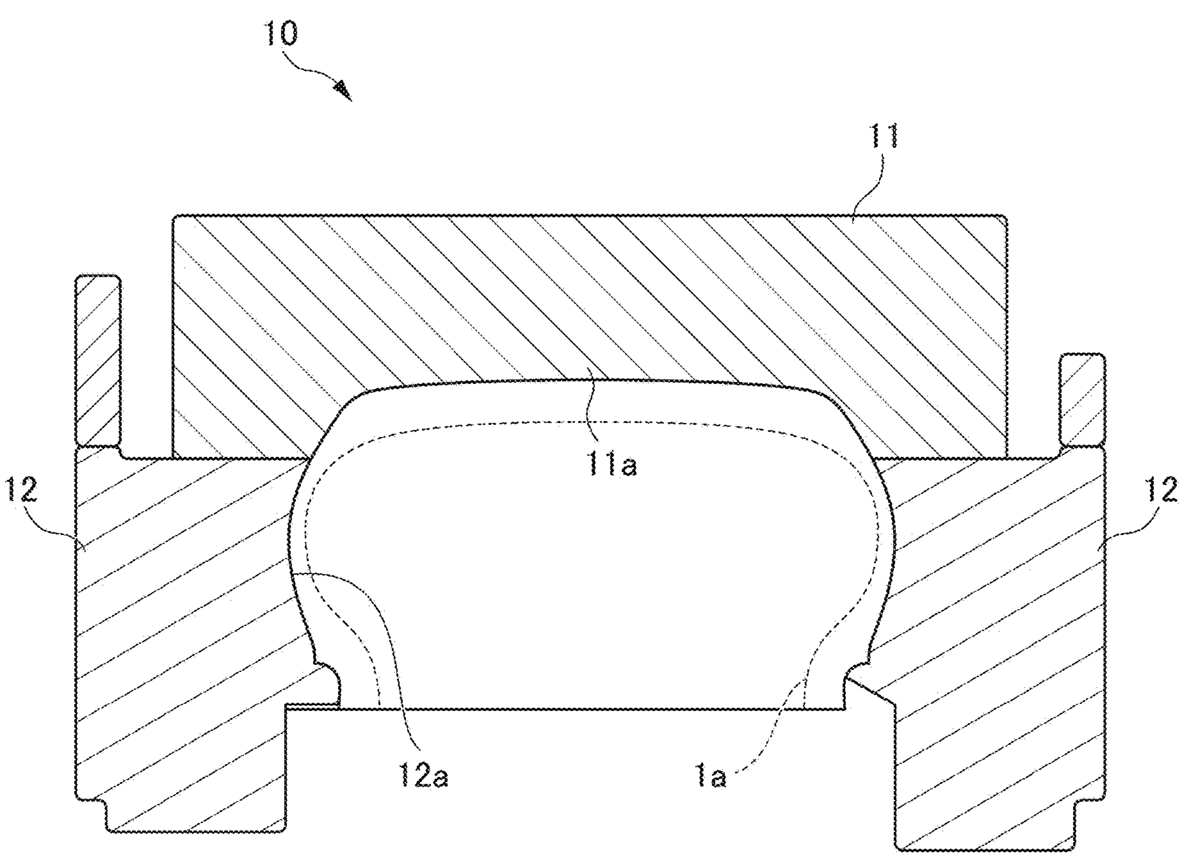
FIG. 2 is a diagram illustrating an example of a tire mold for vulcanization molding the tire 1 of the embodiment.

FIG. 2 illustrates an example of a tire mold for vulcanization molding the tire 1 of the embodiment. FIG. 2 is a meridian sectional view of the tire mold 10, taken along the axial direction of the tire 1 to be molded.

The tire mold 10 illustrated in FIG. 2 includes a plurality of sectors 11 arranged circumferentially along the outer circumference of the tire 1, a pair of side plates 12 disposed at both axial sides of an annular body formed by the plurality of sectors 11 combined with each other, and a pair of bead rings (not shown). At the time of vulcanization molding, an unvulcanized tire 1*a* to be molded into the tire 1 is set inside the tire mold 10, as indicated by the broken line in FIG. 2. The assembly of the sectors 11, the side plates 12, and the bead rings constitutes the mold for molding the tire 1, and the entire outer surface of the tire 1 is molded by the inner surface of the mold, namely, the inner surfaces 11*a* of the sectors 11, the inner surfaces 12*a* of the side plates 12, and the inner surfaces of the bead rings. During vulcanization molding, a bladder (not shown) that presses the unvulcanized tire 1*a* against the inner surface of the tire mold 10 is disposed inside the unvulcanized tire 1*a*. The plurality of sectors 11 mainly play a role in forming the tread 4, and the pair of side plates 12 mainly play a role in forming the sidewalls 3. The pair of bead rings play a role in forming the beads 2, and the bladder plays a role in forming the entire inner surface of the tire 1.

In the tire mold 10, the unvulcanized tire 1*a* is vulcanized so that the rubbers constituting the entire tire 1 are shaped, and the plurality of character protrusions 110, which are described below, are formed in the pattern regions 7 described above.

Figure 3:
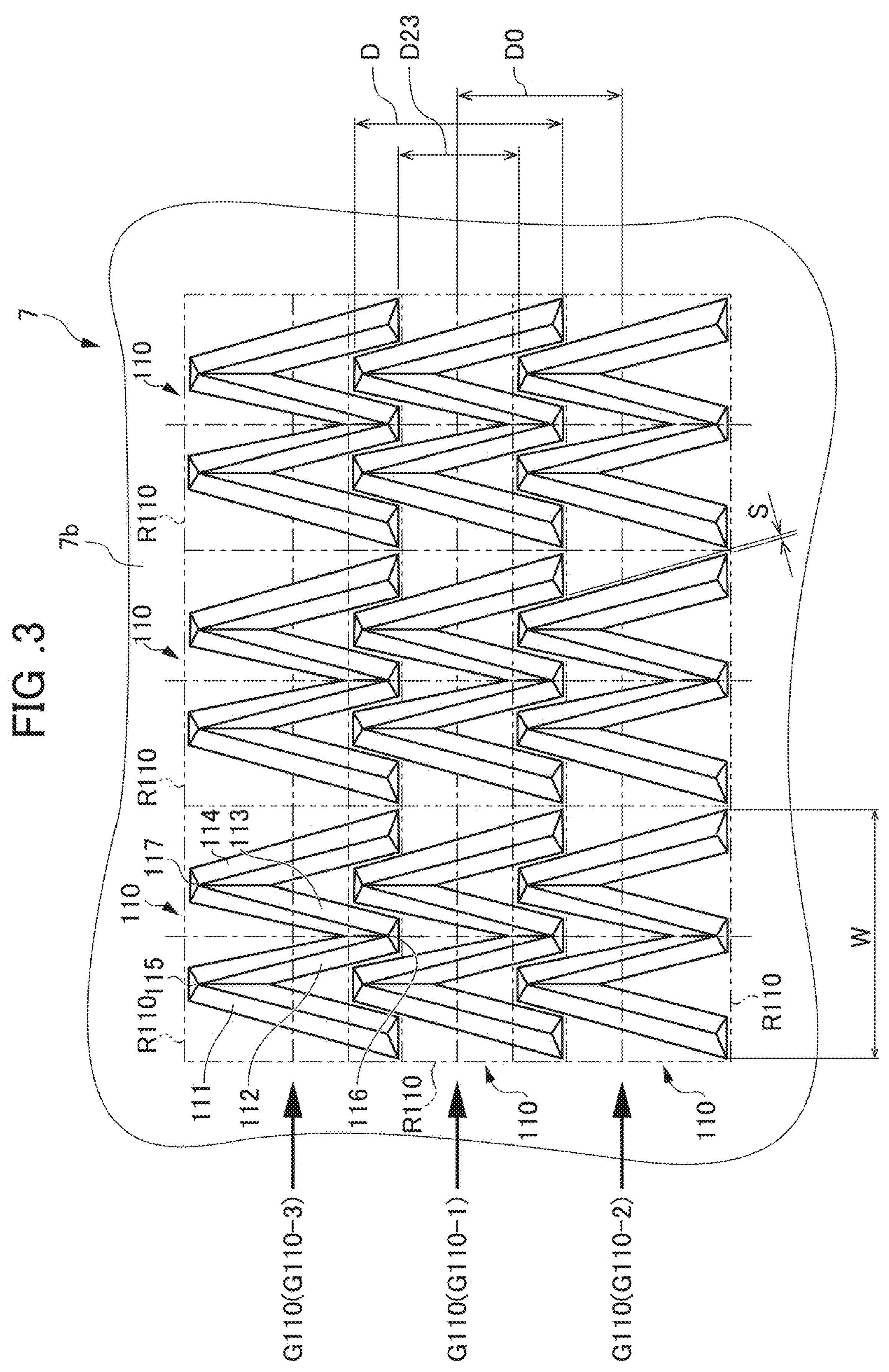
FIG. 3 is a plan view illustrating a state in which a plurality of character protrusions 110 are provided on a UV unwrapping reference surface 7*b*, which results from UV unwrapping a reference surface 7*a* of a pattern region 7.
Figure 4:
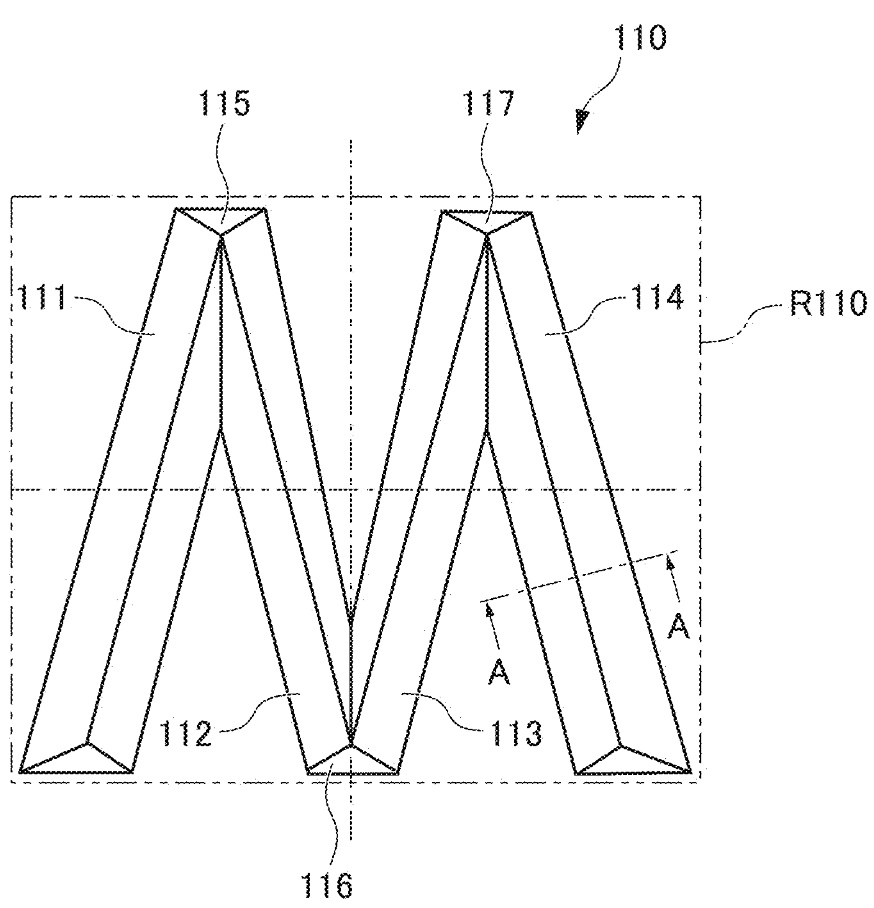
FIG. 4 is a diagram illustrating one character protrusion 110 in the same manner as in FIG. 3.

FIG. 3 is a plan view illustrating a state in which the plurality of character protrusions 110 are provided on a UV unwrapping reference surface 7*b*, which results from UV unwrapping a reference surface 7*a* of the pattern region 7. Although FIG. 3 illustrates a state in which three character protrusions 110 are arranged in each of longitudinal lines and transverse rows, a larger number of character protrusions 110 may be actually arranged. The same applies to the drawings illustrating a second and subsequent embodiments described later. The UV unwrapping reference surface 7*b* is a surface resulting from two-dimensionally unwrapping the three-dimensional outer surface 3*a* of the sidewall 3. FIG. 4 is a diagram illustrating one character protrusion 110 in the same manner as in FIG. 3.

As illustrated in in FIG. 4, each character protrusion 110 of the present embodiment protrudes from the reference surface 7*a* (UV unwrapping reference surface 7*b*) in a shape imitating and delineating the character "M" of the alphabet in plan view. The character protrusion 110 of the first embodiment includes a total of four straight portions 111, 112, 113, and 114 in plan view. The character protrusion 110 of the first embodiment further includes connecting portions 115, 116, and 117 at which the plurality of straight portions (111, 112, 113, and 114) connect to each other, in plan view. Specifically, the straight portion 111 and the straight portion 112 connect to each other at the connecting portion 115. The straight portion 112 and the straight portion 113 connect to each other at the connecting portion 116. The straight portion 113 and the straight portion 114 connect to each other at the connecting portion 117. In the case of the character protrusion 110 of the present embodiment delineating the character "M", the connecting portions 115, 116, and 117 can also be regarded as bent portions at which the straight portions bend, in plan view.

In FIGS. 3 and 4, character protrusion regions R110 are indicated by two-dot chain lines. Each character protrusion region R110 is a region surrounding the outer periphery of one character protrusion 110 delineating a character, and more specifically, is a region having a shape of a parallelogram circumscribed to the contour of the one character protrusion 110, and set to have a minimum area. Each character protrusion region R110 of the present embodiment has a rectangular shape, the four corners of which are right angles. Depending on the shape of the character protrusion, the character protrusion region may have a square shape. It should be noted that the character protrusion regions R110 are virtual regions, and the ranges indicated by the two-dot chain lines are not visible on the sidewall 3. In FIGS. 3 and 4, for ease of comprehension, each character protrusion region R110 is illustrated as being slightly widened so that the boundary of character protrusion region R110 is slightly spaced apart from the character protrusion 110, but the boundary of the character protrusion region R110 is circumscribed to the contour of the character protrusion 110 as defined above. The same applies to the drawings illustrating the second and subsequent embodiments described later. As illustrated in FIG. 4, in the pattern region 7, the character protrusion regions R110 partially overlap with each other.

In the following description, terms such as a longitudinal (up-down) direction, a transverse (left-right) direction, and the like are used to describe the arrangement of the character protrusions 110. The longitudinal (up-down) direction as used herein refers to a longitudinal (up-down) direction in a state in which the character protrusions 110 are oriented so that the characters imitated thereby are correctly read. The transverse (left-right) direction as used herein refers to a direction orthogonal to the longitudinal (up-down) direction in the same state. Both the longitudinal and transverse directions are not intended to indicate any relationship with the vertical direction or the horizontal direction.

Since the character protrusion regions R110 overlap with each other in the longitudinal (up-down) direction of the character protrusions 110, the following relationship is satisfied: the distance between the center lines of the character protrusions (arrangement pitch in the longitudinal direction) D0<the longitudinal dimension D of the character protrusion (see FIG. 3).

Specifically, when a set of the character protrusions 110 arranged side by side in a first direction (transverse direction) is defined as a character protrusion group G110, the pitch DO between the character protrusion groups G110 adjacent to each other in a second direction (longitudinal direction) orthogonal to the first direction (i.e., the distance between center lines of the character protrusion groups G110) is shorter than the length D of the character protrusion group G110 in the second direction (longitudinal direction) (i.e., the longitudinal dimension of protrusion) (see FIG. 3).

In other words, when sets of the character protrusions 110 arranged side by side in the first direction (transverse direction) are defined as character protrusion groups G110, the character protrusion groups G110 include a first character protrusion group G110-1, a second character protrusion group G110-2 disposed on one side (lower side) of the first character protrusion group G110-1, and a third character protrusion group G110-3 disposed on the other side (upper side) of the first character protrusion group G110-1. The length D in the second direction of the character protrusions 110 constituting the first character protrusion group G110-1 (i.e., the longitudinal dimension of the character protrusions) is longer than a distance D23 from the upper end of the second character protrusion group G110-2 to the lower end of the third character protrusion group G110-3 (see FIG. 3).

In yet other words, the connecting portion (bent portion) 116 of each of the character protrusions 110 constituting the first character protrusion group G110-1 is positioned in between the connecting portion (bent portion) 115 and the connecting portion (bent portion) 117 of the corresponding one of the character protrusions 110 constituting the second character protrusion group G110-2.

The character protrusions 110 of the present embodiment, each of which is composed of a combination of the straight portions 111, 112, 113, and 114 as described above, are easy to process. Furthermore, it is easy to achieve an arrangement in which the character protrusion regions R110 overlap with each other. In addition, according to the present embodiment, the character protrusions 110 delineating the character "M" have an axisymmetric character shape, and therefore, it is easy to achieve an arrangement in which the character protrusion regions R110 overlap with each other. Moreover, according to the present embodiment, since the character protrusions 110 delineating the character "M" each include the straight portions 111, 112, 113, and 114 that connect (bend) at the same angle at the connecting portions (bent portions) 115, 116, and 117, it is easy to achieve an arrangement in which the character protrusion regions R110 overlap with each other.

Figure 5:
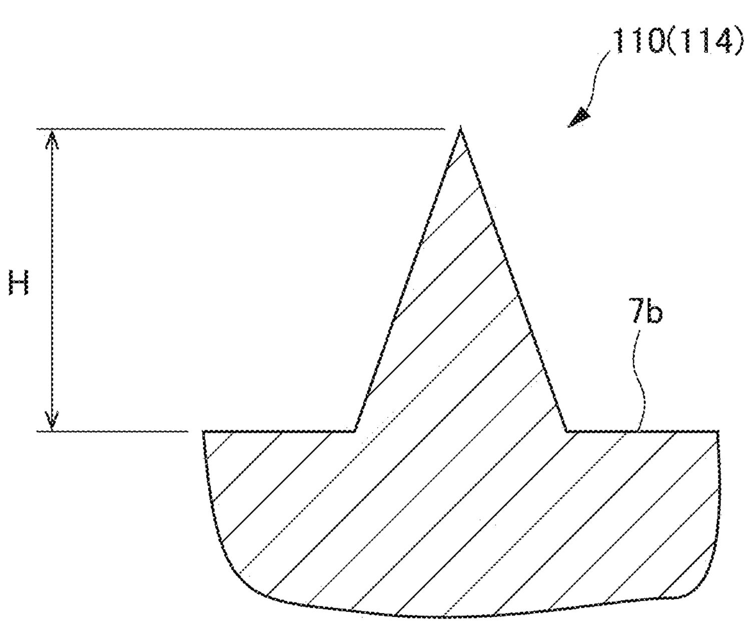
FIG. 5 is a cross-sectional view of the character protrusion 110 taken along line A-A in FIG. 4.

FIG. 5 is a cross-sectional view of the character protrusion 110 taken along line A-A in FIG. 4. Each of the straight portions 111, 112, 113, and 114 of the character protrusion 110 has a substantially triangular shape in cross section taken in a direction orthogonal to the direction in which the straight portion extends, and protrudes outward in the tire axial direction from the UV unwrapping reference surface 7*b* (reference surface 7*a*). Since the character protrusions 110 are densely arranged in a state in which the character protrusion regions R110 overlap with each other, a part of light incident on the character protrusions 110 in the pattern region 7 is repeatedly reflected between adjacent protrusions (the straight portions 111, 112, 113, and 114, and the connecting portions 115, 116, and 117). Such reflection of light occurs between the plurality of protrusions, whereby the light incident on the character protrusions 110 in the pattern region 7 is gradually attenuated and absorbed. Since a part of the light incident on the character protrusions 110 is absorbed and prevented from exiting to the outside, the pattern region 7 having the character protrusions 110 provided therein is visually recognized as being blacker than the outer surface 3*a* of the sidewall 3 that reflects ambient light around the pattern region 7.

The degrees to which pattern regions 7 appear black were evaluated using a plurality of samples including character protrusions 110 having different dimensions (longitudinal dimension D and transverse width W), different protruding heights H, and different minimum distances S (see FIG. 3) between the straight portion 111, 112, 113, or 114 of one character protrusion 110 and the straight portion 111, 112, 113, or 114 of another character protrusion 110 at position where they are closest to each other. As a comparative example, a sample including protrusions with a simple conical shape was also evaluated. FIG. 6 is a table showing the evaluation results. The evaluations shown in FIG. 6 were made based on the results obtained by quantifying the colors of the pattern regions 7 in the L*a*b* color space using a color reader CR20 manufactured by KONICA MINOLTA JAPAN, INC.

The results shown in FIG. 6 indicate that in order to make the pattern region 7 visually recognizable as being blacker, it is desirable for the character protrusions 110 to have a protruding height H of 0.5 mm or greater and 1.0 mm or less. In order to make the pattern region 7 visually recognizable as being blacker, it is desirable for the character protrusions 110 to have a longitudinal dimension D of 0.5 mm or greater and 1.0 mm or less and a transverse width W of 1.5 mm or greater and 2.0 mm or less. Furthermore, in order to make the pattern region 7 visually recognizable as being blacker, it is desirable to set the minimum distance S to 0.1 mm or greater and 0.3 mm or less. Moreover, in order to make the pattern region 7 visually recognizable as being blacker, it is desirable to set a ratio DO/D, i.e. a ratio of the distance DO between the center lines of the character protrusions 110 (arrangement pitch in the longitudinal direction) to the longitudinal dimension D of the character protrusion 110 to 0.5 or greater and 0.9 or less.

The tire 1 according to the present embodiment described above exerts the following effects.

(1) A tire 1 according to the present embodiment includes: a pattern region 7 on an outer surface of a sidewall 3 of the tire 1, the pattern region 7 being visually recognizable as being different from a region other than pattern region 7 in the outer surface of the sidewall 3 part of the tire 1; and a plurality of character protrusions 110 separate from each other in the pattern region 7. The character protrusions 110 each imitate a character or a rotated or inverted character. Regions each of which has a shape of a parallelogram circumscribed to the contour of a respective one of the character protrusions 110 and is set to have a minimum area are defined as character protrusion regions R110, and the character protrusion regions R110 of adjacent ones of the character protrusions 110 partially overlap with each other.

This feature makes it possible to provide the tire including the character protrusions 110 arranged more densely, capable of enhancing a light-absorbing effect, having a higher black color intensity than the known art, and contributing to a higher contrast. In addition, when the pattern region 7 is observed in detail, the minute characters can be visually recognized, which makes it possible to add visual interest and to improve the design.

(2) In the tire 1 according to (1), the character protrusions 110 each include a plurality of straight portions 111, 112, 113, and 114 and connecting portions 115, 116, and 117 at which the plurality of straight portions 111, 112, 113, and 114 connect to each other.

This feature makes it easy to densely arrange the character protrusions 110, and facilitates production of the character protrusions 110.

(3) In the tire 1 according to (1) or (2), the character protrusions 110 each include a plurality of bent portions.

This feature makes it easy to densely arrange the character protrusions 110, and facilitates production of the character protrusions 110.

(4) In the tire 1 according to any one of (1) to (3), the character protrusion regions R110 of adjacent three or more of the character protrusions 110 partially overlap with each other.

This feature makes it possible to arrange the character protrusions 110 in a wide pattern region 7.

(5) In the tire according to any one of (1) to (3), among the character protrusions, those adjacent to each other and having the character protrusion regions R110 partially overlapping with each other delineate the same character.

Due to this feature, the character protrusions 110 can be regularly arranged, and an appearance with excellent design properties can be provided.

Second Embodiment

Figure 7:
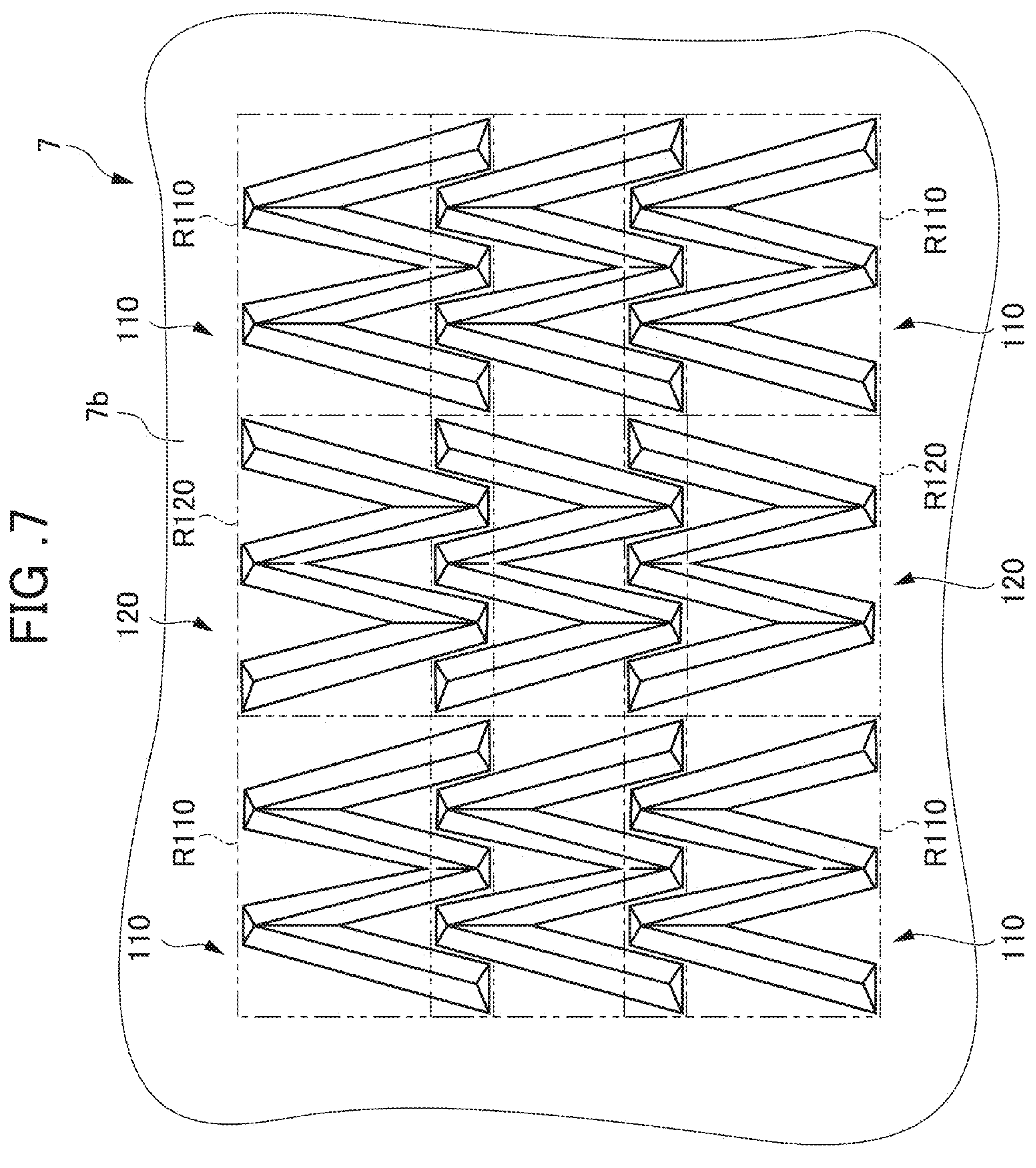
FIG. 7 is a diagram illustrating a second embodiment of the character protrusions provided in a pattern region 7 of the tire 1.

FIG. 7 is a diagram illustrating a second embodiment of the character protrusions provided in a pattern region 7 of the tire 1. The second embodiment and the subsequent embodiments described below are the same as the first embodiment except for the specific shapes of the character protrusions provided in the pattern region 7. Therefore, components that perform the same functions as those of the above-described first embodiment are denoted by the same reference signs, and redundant description thereof is omitted as appropriate. In the second embodiment, character protrusions 120 are arranged in the pattern region 7, in addition to the same character protrusions 110 as those of the first embodiment.

The character protrusions 110 of the second embodiment have the same shape as that of the character protrusions 110 of the first embodiment, and character protrusion regions R110 of the second embodiment partially overlap with each other is the longitudinal direction.

Each character protrusion 120 has a shape corresponding to the character protrusion 110 rotated by 180 degrees (or inverted in the longitudinal direction) on the UV unwrapping reference surface 7*b*. The shape of each character protrusion 120 imitates the character "W" in the orientation shown in FIG. 7. The character protrusions 120 are arranged such that character protrusion regions R120 thereof partially overlap with each other in the longitudinal direction. The manner in which the character protrusion regions R120 overlap with other and the preferable manner in which the character protrusion regions R120 overlap with other are the same as those in the first embodiment. Each character protrusion 120 is adjacent to the character protrusion 110 in the transverse direction.

As in the second embodiment, character protrusions imitating different characters may be combined with each other, or character protrusions imitating a character in the normal orientation and character protrusions imitating the character in a rotated or inverted orientation (rotated or inverted character) may be combined with each other.

Third Embodiment

Figure 8:
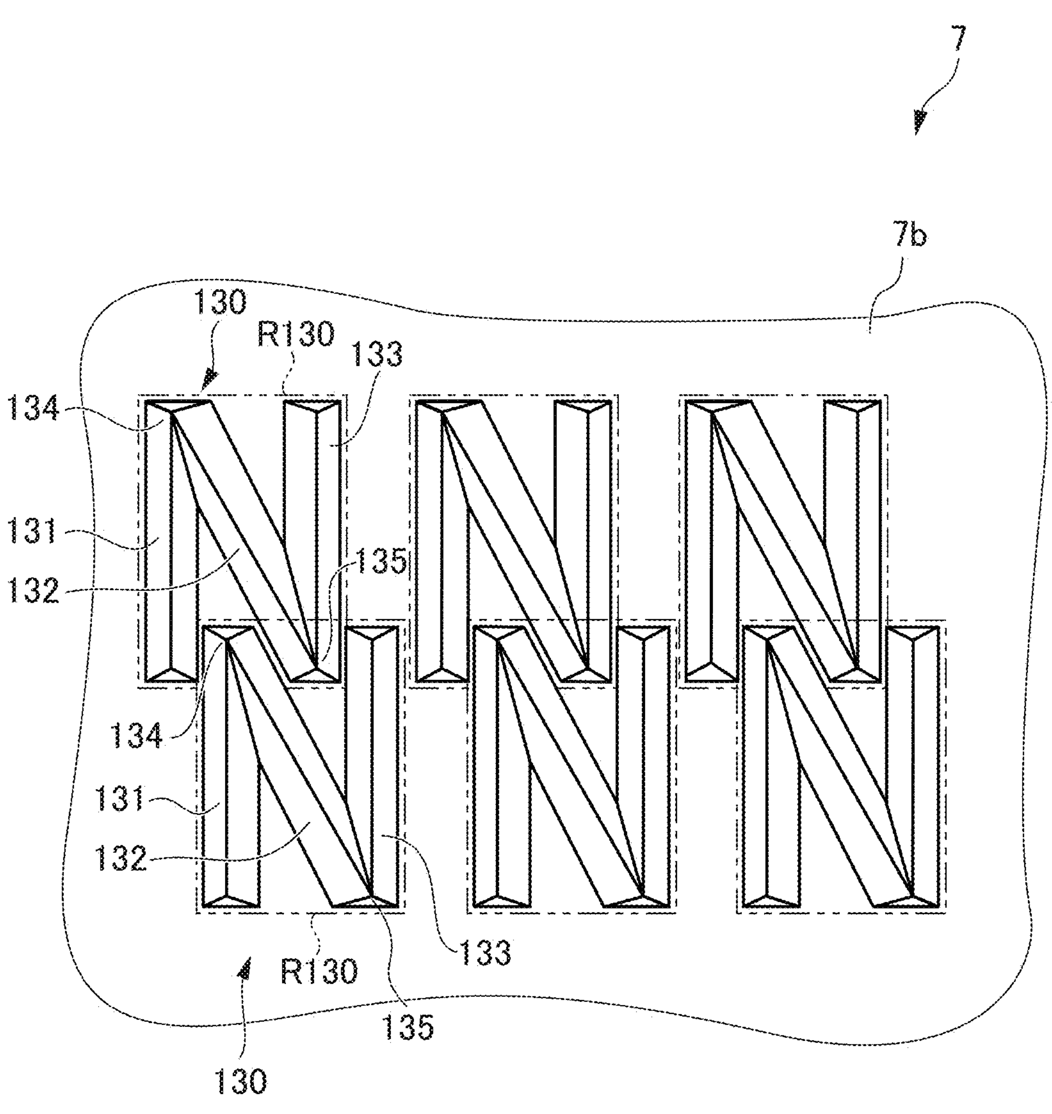
FIG. 8 is a diagram illustrating a third embodiment of the character protrusions provided in a pattern region 7 of the tire 1.

FIG. 8 is a diagram illustrating a third embodiment of the character protrusions provided in a pattern region 7 of the tire 1. In the third embodiment, character protrusions 130 imitating the character "N" are arranged in the pattern region 7. The character protrusions 130 are arranged such that character protrusion regions R130 thereof partially overlap with each other in the longitudinal direction. Each character protrusion 130 includes straight portions 131, 132, and 133 and connecting portions (bent portions) 134 and 135. Specifically, the straight portion 131 and the straight portion 132 connect to each other at the connecting portion 134. The straight portion 132 and the straight portion 133 connect to each other at the connecting portion 135.

The same character protrusions 130 are arranged in rows in the left-right direction such that the character protrusion regions R130 adjacent to each other in the up-down direction partially overlap with each other while being shifted in position from each other in the left-right direction. Shifting characters in position from each other is also referred to as "shifting the phases" and "shifting the characters in phase". Here, a state in which the phases of characters arranged in the up-down direction are shifted in the left-right direction refers to, for example, a state in which the center of the upper character is shifted in the left-right direction from the center of the lower character when the lower character is regarded as the reference. Likewise, a state in which the phases of the characters arranged in the left-right direction are shifted in the up-down direction refers to, for example, a state in which the center of the right character is shifted in the up-down direction from the center of the left character when the left character is regarded as the reference.

In the present embodiment, the connecting portion (bent portion) 134 of each of the character protrusions 130 in the lower row is positioned in between the straight portion 131 and the connecting portion (bent portion) 135 of the corresponding one of the character protrusions 130 in the upper row, and the connecting portion (bent portion) 135 of each of the character protrusions 130 in the upper row is positioned in between the connecting portion (bent portion) 134 and the straight portion 133 of the corresponding one of the character protrusions 130 in the lower row. Furthermore, the straight portions 131 of the character protrusions 130 in the upper row are each positioned in between the character protrusions 130 adjacent to each other in the lower row. Due to this arrangement, the oblique straight portion 132 of one character protrusion 130 and the oblique straight portion 132 of another adjacent character protrusion 130 are in parallel and close to each other.

As in the third embodiment, in the case of the character protrusion regions of character protrusions imitating the same character, an arrangement in which the character protrusion regions overlap with each other in the longitudinal direction can be easily achieved by arranging the characters adjacent to each other in the up-down direction so as to be shifted in position from each other in the left-right direction (i.e., to be shifted in phase from each other in the left-right direction).

Fourth Embodiment

Figure 9:
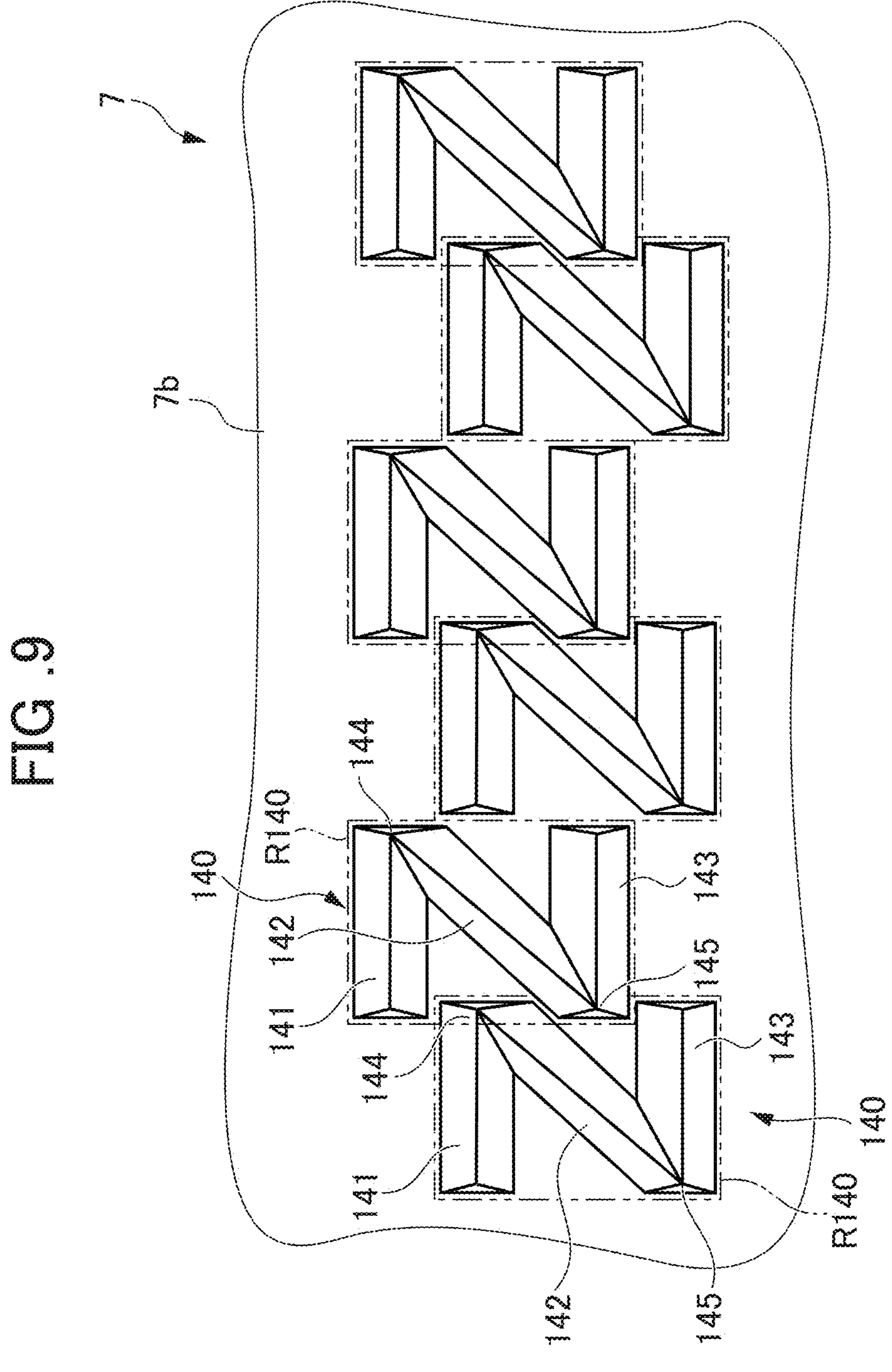
FIG. 9 is a diagram illustrating a fourth embodiment of the character protrusions provided in a pattern region 7 of the tire 1.

FIG. 9 is a diagram illustrating a fourth embodiment of the character protrusions provided in a pattern region 7 of the tire 1. In the fourth embodiment, character protrusions 140 imitating the character "Z" are arranged in the pattern region 7. The character protrusions 140 are arranged such that character protrusion regions R140 thereof partially overlap with each other in the transverse direction. Each character protrusion 140 includes straight portions 141, 142, and 143 and connecting portions (bent portions) 144 and 145. Specifically, the straight portion 141 and the straight portion 142 connect to each other at the connecting portion 144. The straight portion 142 and the straight portion 143 connect to each other at the connecting portion 145.

The character protrusions 140 are arranged while being shifted in phase from each other in the up-down direction such that the character protrusion regions R140 of the character protrusions 140 adjacent to each other in the left-right direction partially overlap with each other. Specifically, the character protrusion 140 are arranged adjacent to each other in the left-right direction such that the right character protrusion 140 is shifted upward in phase with respect to the left character protrusion 140. As a result, the connecting portion (bent portion) 144 of the left character protrusion 140 is positioned in between the straight portion 141 and the connecting portion (bent portion) 145 of the right character protrusion 140.

As in the fourth embodiment, in the case of the character protrusion regions of character protrusions imitating the same character, an arrangement in which the character protrusion regions overlap with each other in the longitudinal direction can be easily achieved by arranging the characters adjacent to each other in the left-right direction so as to be shifted in position from each other in the up-down direction (i.e., to be shifted in phases from each other in the up-down direction).

Fifth Embodiment

Figure 10:
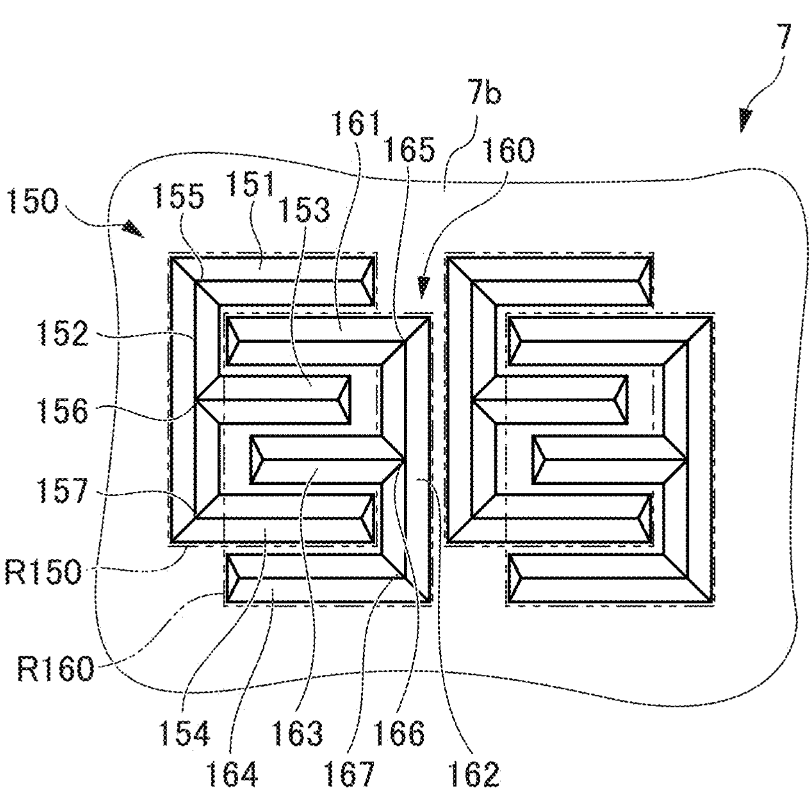
FIG. 10 is a diagram illustrating a fifth embodiment of the character protrusions provided in a pattern region 7 of the tire 1.

FIG. 10 is a diagram illustrating a fifth embodiment of the character protrusions provided in a pattern region 7 of the tire 1. In the fifth embodiment, character protrusions 150 imitating the character "E" and character protrusions 160 having a shape corresponding to the character protrusion 150 rotated by 180 degrees (or inverting in the left-right direction) on the UV unwrapping reference surface 7*b* are arranged in the pattern region 7. The character protrusion region R150 of the character protrusion 150 partially overlaps with the character protrusion region R160 of the character protrusion 160.

Each character protrusion 150 includes straight portions 151, 152, 153, and 154 and connecting portions (bent portions) 155, 156, and 157. Specifically, the straight portion 151 and the straight portion 152 connect to each other at the connecting portion 155. An intermediate part of the straight portion 152 and the straight portion 153 connect to each other at the connecting portion 156. The straight portion 152 and the straight portion 154 connect to each other at the connecting portion 157.

Like the character protrusion 150, each character protrusion 160 includes straight portions 161, 162, 163, and 164 and connecting portions (bent portions) 165, 166, and 167. Specifically, the straight portion 161 and the straight portion 162 connect to each other at the connecting portion 165. An intermediate portion of the straight portion 162 and the straight portion 163 connect to each other at the connecting portion 166. The straight portion 162 and the straight portion 164 connect to each other at the connecting portion 167.

The character protrusion 150 and the character protrusion 160 are arranged adjacent to each other in the left-right direction while being shifted in phase from each other in the up-down direction such that the character protrusion region R150 of the character protrusion 150 and the character protrusion region R160 of the character protrusion 160 partially overlap with each other. Specifically, the character protrusion 150 and the character protrusion 160 are arranged adjacent to each other in the left-right direction such that the character protrusion 160 on the right is shifted downward in phase with respect to the character protrusion 150 on the left. As a result, the straight portion 153 of the character protrusion 150 on the left is positioned in between the straight portion 161 and the straight portion 163 of the character protrusion 160 on the right. The straight portion 154 of the character protrusion 150 on the left is positioned in between the straight portion 163 and the straight portion 164 of the character protrusion 160 on the right. In other words, the straight portion 161 of the character protrusion 160 on the right is positioned in between the straight portion 151 and the straight portion 153 of the character protrusion 150 on the left. The straight portion 163 of the character protrusion 160 on the right is positioned in between the straight portion 153 and the straight portion 154 of the character protrusion 150 on the left.

As in the fifth embodiment, in the case of the character protrusion regions of character protrusions imitating the same character, an arrangement in which the character protrusion regions overlap with each other in the longitudinal direction can be easily achieved by arranging the character protrusion in the normal orientation and the character protrusion in a rotated (or inverted) orientation adjacent to each other in the left-right direction so as to be shifted in position from each other in the up-down direction (i.e., to be shifted in phases in the up-down direction). In particular, in the present embodiment in which the character protrusions 150 imitating the character "E" are combined with the character protrusions 160 having the shape corresponding to the rotated (or inverted) character protrusion 150, the UV unwrapping reference surface 7*b* (reference surface 7*a*) is allowed to be directly exposed in a small region, whereby the light-absorbing effect can be enhanced.

Sixth Embodiment

Figure 11:
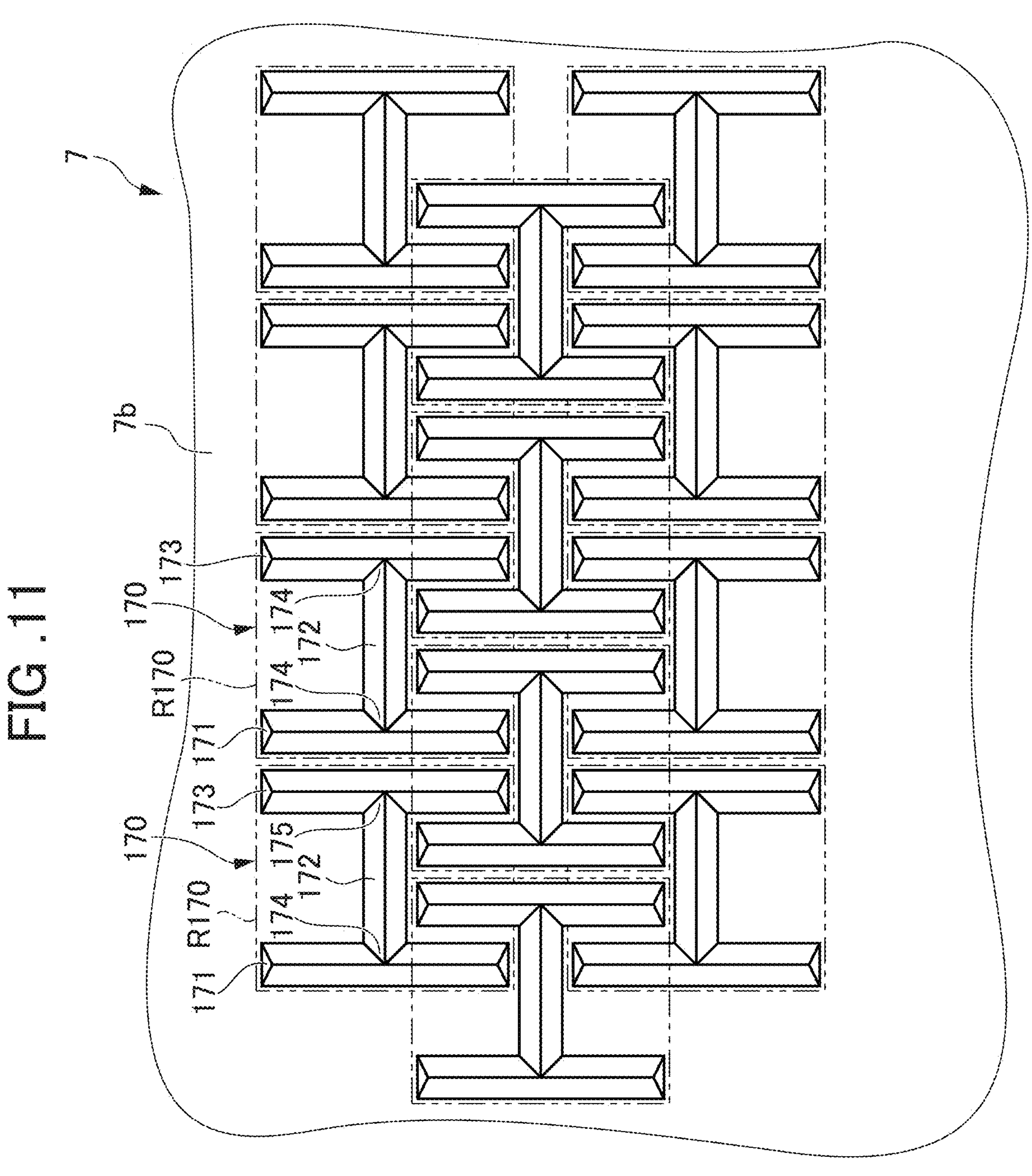
FIG. 11 is a diagram illustrating a sixth embodiment of the character protrusions provided in a pattern region 7 of the tire 1.

FIG. 11 is a diagram illustrating a sixth embodiment of the character protrusions provided in a pattern region 7 of the tire 1. In the sixth embodiment, character protrusions 170 imitating the character "H" are arranged in the pattern region 7. The character protrusions 170 are arranged such that character protrusion regions R170 thereof partially overlap with each other in the longitudinal direction. Each character protrusion 170 includes straight portions 171, 172, and 173 and connecting portions (bent portions) 174 and 175. Specifically, the straight portion 171 and the straight portion 172 connect to each other at the connecting portion 174. The straight portion 172 and the straight portion 173 connect to each other at the connecting portion 175.

The same character protrusions 170 are arranged in rows in the left-right direction such that that the character protrusion regions R170 adjacent to each other in the up-down direction partially overlap with each other while being shifted in phase from each other in the left-right direction. Specifically, with respect to one character protrusion 170 and the upper left and upper right character protrusions 170, a lower part of the straight portion 173 of the upper left character protrusion 170 and a lower part of the straight portion 171 of the upper right character protrusion 170 are positioned in between upper parts of the straight portions 171 and 173 of the one character protrusion 170. With respect to one character protrusion 170 and the lower left and lower right character protrusions 170, an upper part of the strait portion 173 of the lower left character protrusion 170 and an upper part of the straight portion 171 of the lower right character protrusion 170 are positioned in between lower parts of the straight portions 171 and 173 of the one character protrusion 170.

As in the sixth embodiment, the character protrusion regions R170 of two or more character protrusions 170 may overlap with the character protrusion region R170 of one character protrusion 170. In the present embodiment, a maximum of four character protrusion regions R170 may overlap with one character protrusion region R170. In particular, in the present embodiment in which the character protrusions 170 imitate the character "H", the UV unwrapping reference surface 7*b* (reference surface 7*a*) is allowed to be directly exposed in a very small region, whereby the light-absorbing effect can be enhanced.

Seventh Embodiment

Figure 12:
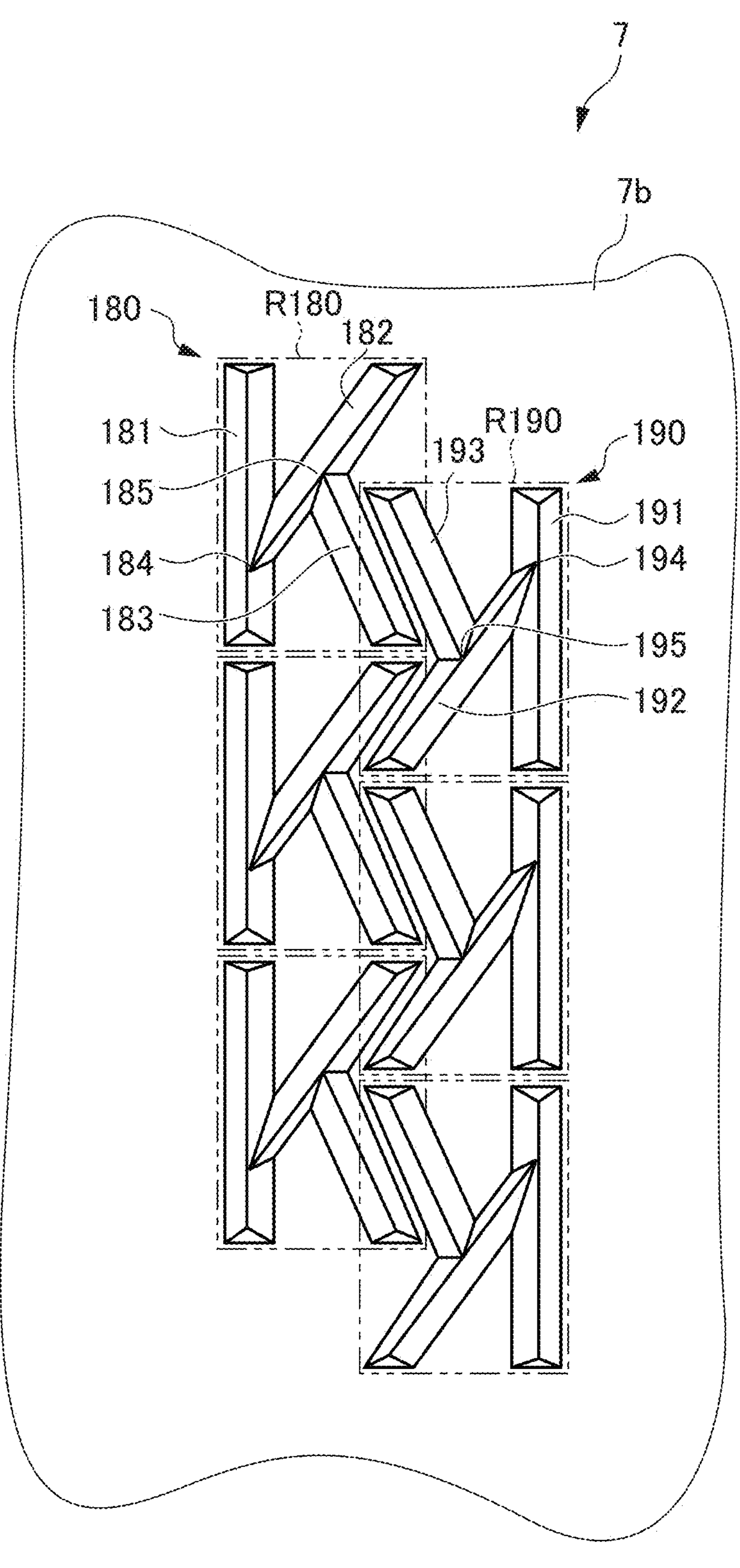
FIG. 12 is a diagram illustrating a seventh embodiment of the character protrusions provided in a pattern region 7 of the tire 1.

FIG. 12 is a diagram illustrating a seventh embodiment of the character protrusions provided in a pattern region 7 of the tire 1. In the seventh embodiment, character protrusions 180 imitating the character "K" and character protrusions 190 having a shape corresponding to the character protrusion 180 rotated by 180 degrees on the UV unwrapping reference surface 7*b* are arranged in the pattern region 7. The character protrusion region R180 of the character protrusion 180 partially overlaps with the character protrusion region R190 of the character protrusion 190.

Each character protrusion 180 includes straight portions 181, 182, and 183, and connecting portions (bent portions) 184 and 185. Specifically, an intermediate part of the straight portion 181 and the straight portion 182 connect to each other at the connecting portion 184. An intermediate part of the straight portion 182 and the straight portion 183 connect to each other at the connecting portion 185.

Like the character protrusion 180, each character protrusion 190 includes straight portions 191, 192, and 193 and connecting portions (bent portions) 194 and 195. Specifically, an intermediate part of the straight portion 191 and the straight portion 192 connect to each other at the connecting portion 194. An intermediate part of the straight portion 192 and the straight portion 193 connect to each other at the connecting portion 195.

The character protrusions 180 and the character protrusions 190 are arranged adjacent to each other in the left-right direction while being shifted in phase from each other in the upward direction and the downward direction such that the character protrusion regions R180 of the character protrusions 180 and the character protrusion regions R190 of the character protrusions 190 partially overlap with each other. Specifically, with respect to each character protrusions 180 on the left, the character protrusions 190 on the right of the character protrusions 180 are shifted in phase in both the upward and downward directions. As a result, the straight portion 182 of each character protrusion 180 on the left is positioned in between the straight portions 192 and 193 of the upper right character protrusion 190. The straight portion 183 of each character protrusion 180 on the left is positioned in between the straight portions 192 and 193 of the lower right character protrusion 190. In other words, the straight portion 192 of the upper right character protrusion 190 and the straight portion 193 of the lower right character protrusion 190 are positioned in between the straight portions 182 and 183 of the character protrusion 180 on the left.

As in the seventh embodiment, in the case of character protrusions imitating the same character, an arrangement in which the character protrusion regions overlap with each other in the traverse direction can be easily achieved by arranging a group of the character protrusions in the normal orientation and a group of the character protrusions in a rotated orientation adjacent to each other in the left-right direction so as to be shifted in position from each other in the up-down direction (i.e., to be shifted in phases in the up-down direction). In the present embodiment, the left character protrusions are in the normal orientation while the right character protrusions have a shape corresponding to the rotated left character protrusion. However, a different arrangement is possible in which the right character protrusions are in the normal orientation while the left character protrusions have a shape corresponding to the right character protrusion inverted in the left-right direction.

Eighth Embodiment

Figure 13:
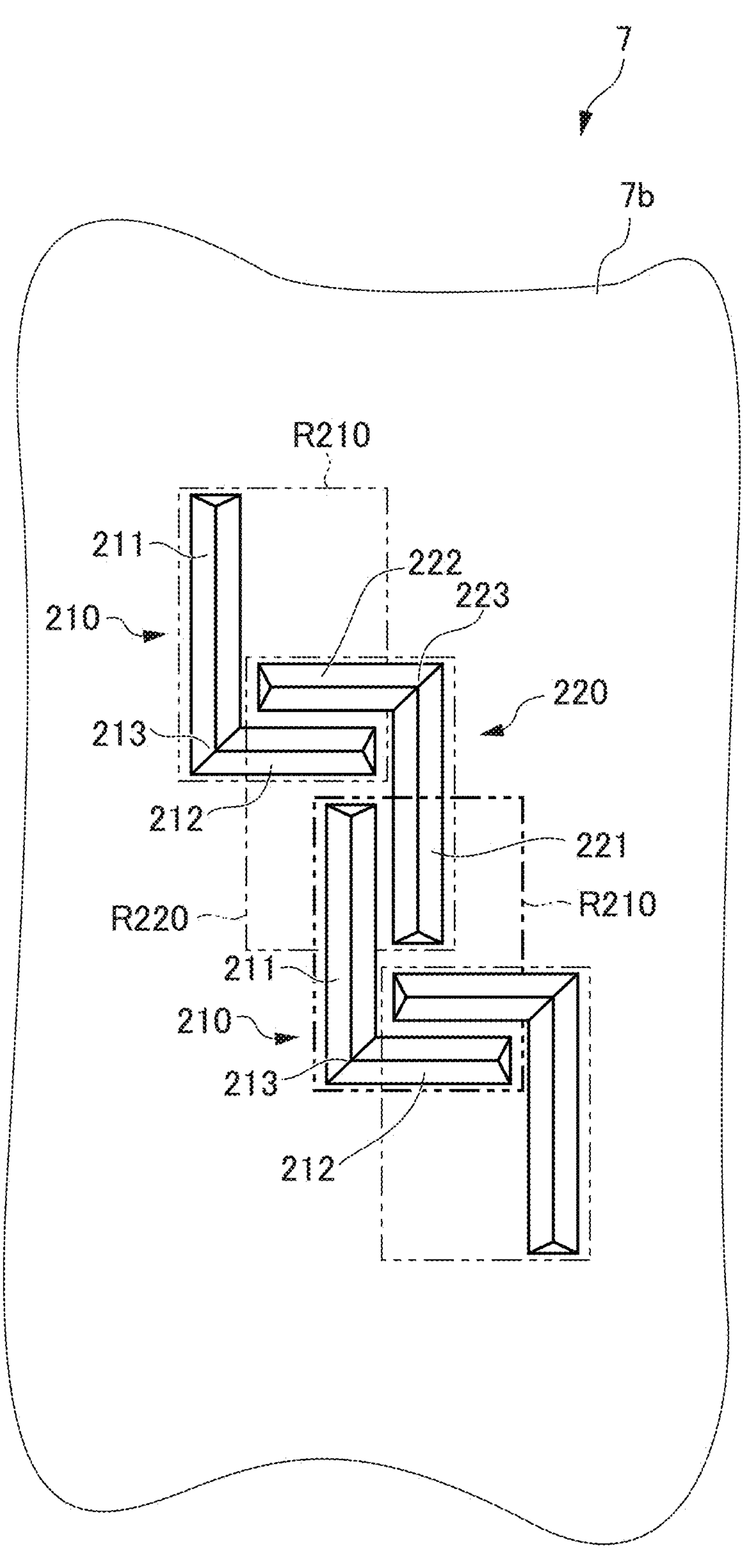
FIG. 13 is a diagram illustrating an eighth embodiment of the character protrusions provided in a pattern region 7 of the tire 1.

FIG. 13 is a diagram illustrating an eighth embodiment of the character protrusions provided in a pattern region 7 of the tire 1. In the eighth embodiment, character protrusions 210 imitating the character "L" and character protrusions 220 having a shape corresponding to the character protrusion 210 rotated by 180 degrees on the UV unwrapping reference surface 7*b* are arranged in the pattern region 7. The character protrusion region R210 of the character protrusion 210 partially overlaps with the character protrusion region R220 of the character protrusion 220.

Each character protrusion 210 includes straight portions 211 and 212 and a connecting portion (bent portion) 213. Specifically, the straight portion 211 and the straight portion 212 connect to each other at the connecting portion 213.

Like the character protrusion 210, each character protrusion 220 includes straight portions 221 and 222 and a connecting portion (bent portion) 223. Specifically, the straight portion 221 and the straight portion 222 connect to each other at the connecting portion 223.

The character protrusion 210 and the character protrusion 220 are arranged adjacent to each other in the up-down direction and the left-right direction while being shifted in phase from each other in both the up-down direction and the left-right direction such that the character protrusion region R210 of the character protrusion 210 and the character protrusion region R220 of the character protrusion 220 partially overlap with each other. Specifically, the character protrusion 210 and the character protrusion 220 are arranged adjacent to each other in the left-right direction such that the character protrusion 220 on the right is shifted downward in phase with respect to the character protrusion 210 on the left, and further, the character protrusions 210 and 220 are shifted in phase from each other in the left-right direction. From another viewpoint, the character protrusions 210 are arranged in an oblique direction while being shifted in phase in both the up-down direction and the left-right direction, and likewise, the character protrusions 220 are also arranged in an oblique direction while being shifted in phase in both the up-down direction and the left-right direction. Thus, one character protrusion 220 has the straight portion 222 disposed above and along the straight portion 212 of the character protrusion 210 on the upper left of the one character protrusion 220. One character protrusion 210 has the straight portion 211 disposed on the left side of the straight portion 221 of the character protrusion 220 on the upper right of the one character protrusion 210.

As in the eighth embodiment, the character protrusions 210 and the character protrusions 220 having a shape corresponding to the rotated character protrusion 210 may be arranged while being shifted in phase from each in both the up-down direction and the left-right direction such that the character protrusion regions R210 of the character protrusions 210 and the character protrusion regions R220 of the character protrusions 220 adjacent to each other in the up-down direction and the left-right direction partially overlap with each other.

Ninth Embodiment

Figure 14:
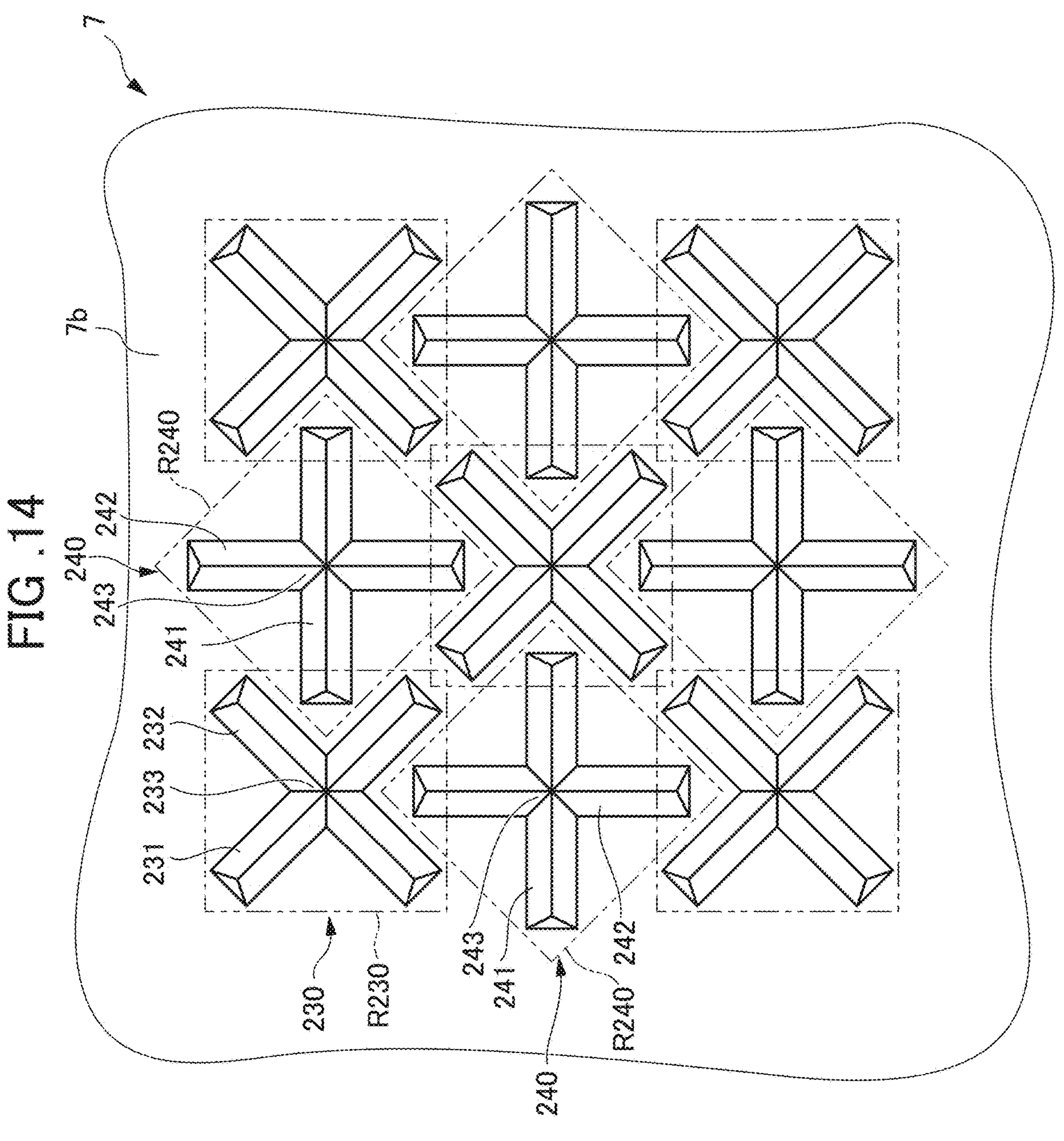
FIG. 14 is a diagram illustrating a ninth embodiment of the character protrusions provided in a pattern region 7 of the tire 1.

FIG. 14 is a diagram illustrating a ninth embodiment of the character protrusions provided in a pattern region 7 of the tire 1. In the ninth embodiment, character protrusions 230 imitating the character "X" and character protrusions 240 having a shape corresponding to the character protrusion 230 rotated by 45 degrees on the UV unwrapping reference surface 7*b* are arranged in the pattern region 7. The character protrusion region R230 of the character protrusion 230 partially overlaps with the character protrusion region R240 of the character protrusion 240.

Each character protrusion 230 includes straight portions 231 and 232 and a connecting portion (bent portion) 233 at which the straight portions intersect with each other. Like the character protrusion 230, each character protrusion 240 includes straight portions 241 and 242 and a connecting portion (bent portion) 243 at which the straight portions intersect with each other.

The character protrusions 230 and the character protrusions 240 are alternately arranged in both the up-down direction and the left-right direction. As a result, either the straight portion 241 or the straight portion 242 of the character protrusions 240 is positioned in four sections in the character protrusion 230, each of which is located between the straight portions 231 and 232.

As in the ninth embodiment, an arrangement in which the character protrusion regions overlap with each other can be easily achieved by arranging the character protrusions imitating a character and the character protrusions having a shape corresponding to the same character rotated by a predetermined angle (45 degrees in the present embodiment).

Tenth Embodiment

Figure 15:
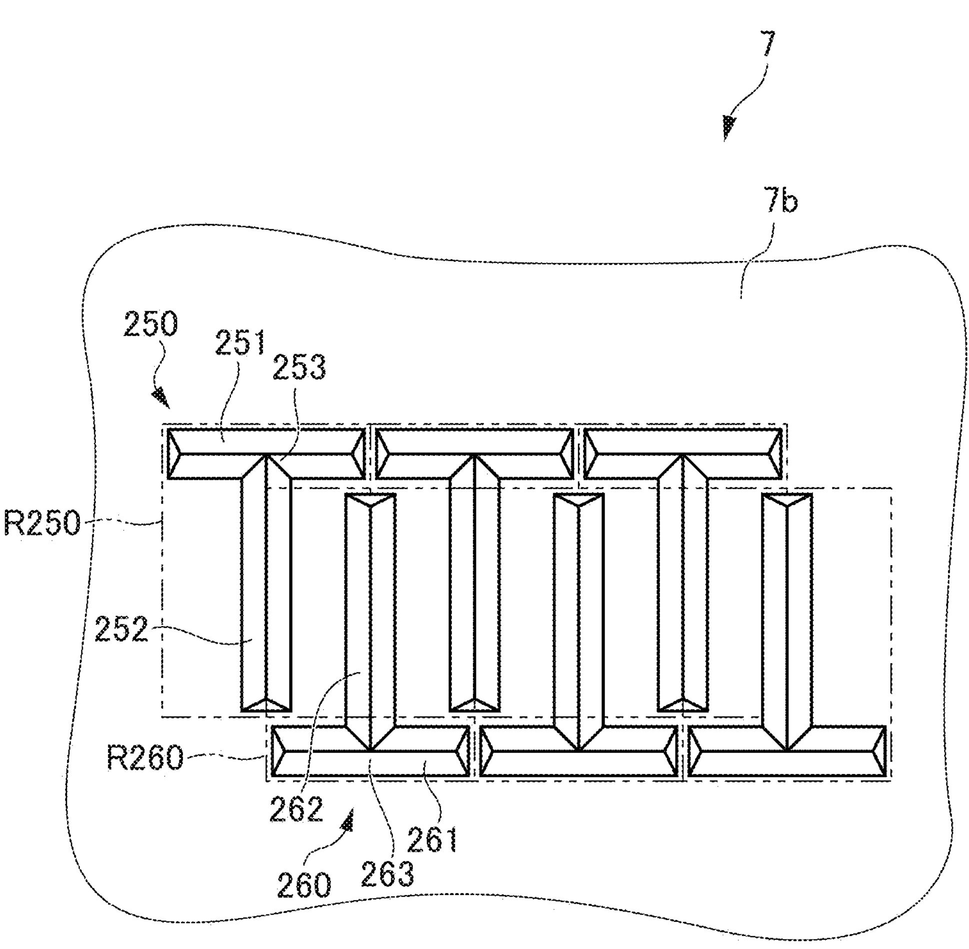
FIG. 15 is a diagram illustrating a tenth embodiment of the character protrusions provided in a pattern region 7 of the tire 1.

FIG. 15 is a diagram illustrating a tenth embodiment of the character protrusions provided in a pattern region 7 of the tire 1. In the tenth embodiment, character protrusions 250 imitating the character of "T" and character protrusions 260 having a shape corresponding to the character protrusion 250 rotated by 180 degrees (or inverted in the up-down direction) on the UV unwrapping reference surface 7*b* are arranged in the pattern region 7. The character protrusion region R250 of the character protrusion 250 partially overlaps with the character protrusion region R260 of the character protrusion 260.

Each character protrusion 250 includes straight portions 251 and 252 and a connecting portion (bent portion) 253. Specifically, an intermediate part of the straight portion 251 and the straight portion 252 connect to each other at the connecting portion 253.

Like the character protrusion 250, each character protrusion 260 includes straight portions 261 and 262 and a connecting portion (bent portion) 263. Specifically, an intermediate part of the straight portion 261 and the straight portion 262 connect to each other at the connecting portion 263.

The character protrusions 250 having the same shape are arranged in the left-right direction. The character protrusions 260 having the same shape are also arranged in the left-right direction. The character protrusions 260 are arranged below the character protrusions 250 while being shifted in phase from the character protrusion 250 in the left-right direction. Thus, the straight portions 262 of the character protrusions 260 on the lower side are each positioned in between the straight portions 252 of the character protrusions 250 arranged adjacent to each other in the left-right direction on the upper side. In other words, the straight portions 252 of the character protrusions 250 on the upper side are each positioned in between the straight portions 262 of the character protrusions 260 arranged adjacent to each other in the left-right direction on the lower side.

As in the tenth embodiment, in the case of the character protrusion regions of character protrusions imitating the same character, an arrangement in which the character protrusion regions overlap with each other in the longitudinal direction can be easily achieved by arranging the character protrusions in the normal orientation and the character protrusions in a rotated orientation (or up-down direction inverted orientation) adjacent to each other in the up-down direction so as to be shifted in position from each other in the left-right direction (i.e., to be shifted in phases from each other in the left-right direction).

Eleventh Embodiment

Figure 16:
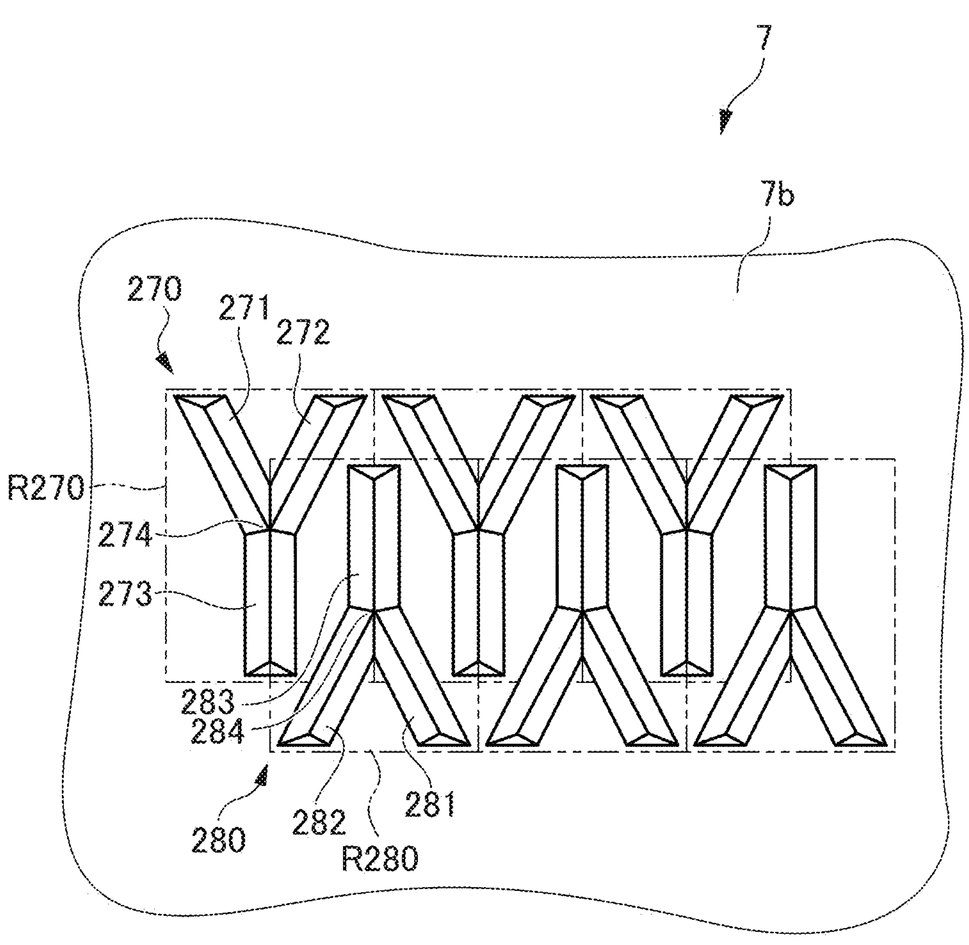
FIG. 16 is a diagram illustrating an eleventh embodiment of the character protrusions provided in a pattern region 7 of the tire 1.

FIG. 16 is a diagram illustrating an eleventh embodiment of the character protrusions provided in a pattern region 7 of the tire 1. In the eleventh embodiment, character protrusions 270 imitating the character of "Y" and character protrusions 280 having a shape corresponding to the character protrusion 270 rotated by 180 degrees (or inverted in the up-down direction) on the UV unwrapping reference surface 7*b* are arranged in the pattern region 7. The character protrusion region R270 of the character protrusion 270 partially overlaps with the character protrusion region R280 of the character protrusion 280. The eleventh embodiment can be regarded as an embodiment corresponding to the tenth embodiment in which the character "T" is replaced with the character "Y".

Each character protrusion 270 includes straight portions 271, 272, and 273, and a connecting portion (bent portion) 274. Specifically, the straight portion 271, the straight portion 272, and the straight portion 273 connect to each other at the connecting portion 274.

Like the character protrusion 270, each character protrusion 280 includes straight portions 281, 282, and 283, and a connecting portion (bent portion) 284. Specifically, the straight portion 281, the straight portion 282, and straight portion 283 connect to each other at the connecting portion 284.

The character protrusions 270 having the same shape are arranged in the left-right direction. The character protrusions 280 having the same shape are also arranged in the left-right direction. The character protrusions 280 are arranged below the character protrusions 270 while being shifted in phase from the character protrusion 270 in the left-right direction. Thus, the straight portions 283 of the character protrusions 280 on the lower side are each positioned in between the straight portions 273 of the character protrusions 270 arranged adjacent to each other in the left-right direction on the upper side. In other words, the straight portions 273 of the character protrusions 270 on the upper side are each positioned in between the straight portions 283 of the character protrusions 280 arranged adjacent to each other in the left-right direction on the lower side.

Even in the case where the character "T" of the tenth embodiment is replaced with the character "Y" as in the eleventh embodiment, an arrangement in which the character protrusion regions overlap with each other can be easily achieved as in the tenth embodiment.

(Modifications)

The present disclosure is not limited to the embodiments described above, and various modifications and changes can be made, which are also encompassed in the scope of the present disclosure.

(Modification 1)

Figure 17:
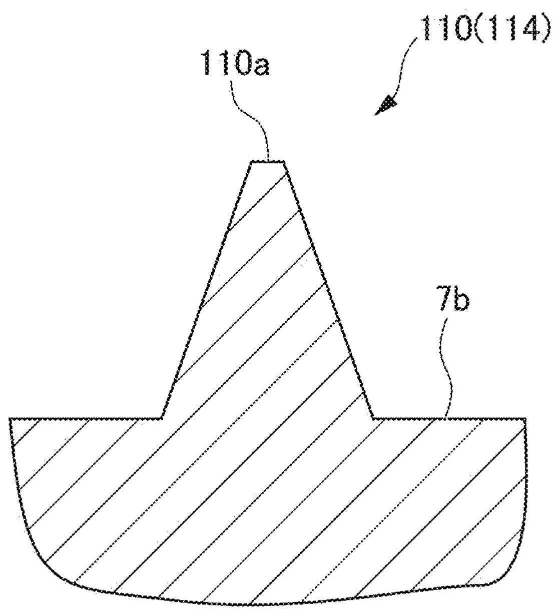
FIG. 17 is a diagram illustrating a modification of the protrusion cross-sectional shape of the character protrusion 110.
Figure 18:
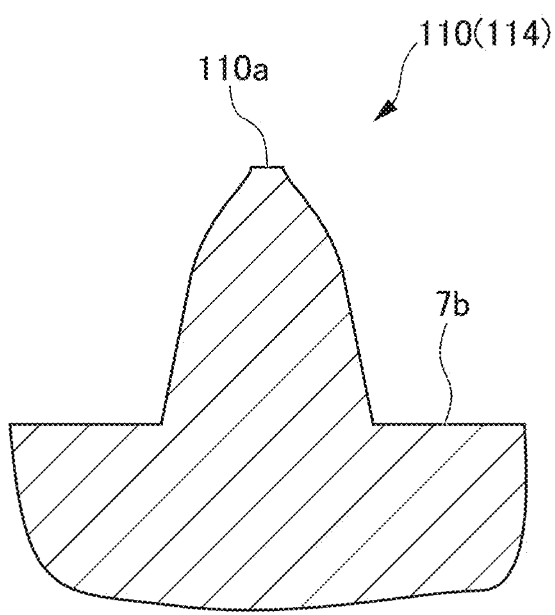
FIG. 18 is a diagram illustrating a modification of the protrusion cross-sectional shape of the character protrusion 110.

In the first embodiment, an example has been described in which the character protrusions 110 having a substantially triangular cross-sectional shape protrude from the UV unwrapping reference surface 7*b* (reference surface 7*a*). The present disclosure is not limited thereto, and the cross-sectional protrusion shape of the character protrusion 110 may be changed as appropriate. FIGS. 17 and 18 are diagrams each illustrating a modification of the cross-sectional protrusion shape of the character protrusion 110. For example, as illustrated in FIG. 17, the cross-sectional shape of the character protrusion 110 may be a substantially isogonal trapezoid (isosceles trapezoid) having a top portion 110*a* parallel to the UV unwrapping reference surface 7*b*. Alternatively, as illustrated in FIG. 18, for example, the cross-sectional shape of the character protrusion 110 may be a protruding shape having a top portion 110*a* parallel to the UV unwrapping reference surface 7*b* and having a side surface 110*b* bulging outward. Furthermore, the tip of the protrusion shape may be rounded instead of being flat. The modifications of the cross-sectional shape of the character protrusion are also applicable to the second and subsequent embodiments.

(Modification 2)

In each of the above embodiments, the character protrusions imitating an alphabetical capital letter (alphabetic character) have been described as an example. The present disclosure is not limited thereto, and the character protrusions may imitate an alphabetical capital letter (alphabetic character), a numeral, or a character in another language such as Japanese or Korean.

Although the embodiments and the modifications may be combined with each other as appropriate, detailed description of such combinations are omitted. It should be noted that the present disclosure is not limited to the embodiments described above.

What is claimed is:

1. A tire comprising:

a pattern region on an outer surface of a sidewall of the tire, the pattern region being visually recognizable as being different from a region other than the pattern region in the outer surface of the tire; and a plurality of character protrusions separate from each other in the pattern region, wherein the character protrusions each imitate a character or a rotated or inverted character, and wherein regions, each of which having a shape of a parallelogram circumscribed to a contour of a respective one of the character protrusions and is set to have a minimum area, are defined as character protrusion regions, and the character protrusion regions of adjacent ones of the character protrusions partially overlap with each other;

wherein each character protrusion comprises a language character or a numeral;

each character protrusion has a longitudinal dimension (D) of 0.5 mm or greater and 1.0 mm or less and a transverse width (W) of 1.5 mm or greater and 2.0 mm or less;

wherein a ratio of a distance (DO) between center lines of adjacent character protrusions in a longitudinal direction to the longitudinal dimension (D) of the character protrusion is 0.5 or greater and 0.9 or less.

2. The tire according to claim 1, wherein the character protrusions each include:

a plurality of straight portions, and a connecting portion at which the plurality of straight portions connect to each other.

3. The tire according to claim 2, wherein the character protrusions each include a plurality of bent portions.

4. The tire according to claim 2, wherein the character protrusion regions of adjacent three or more of the character protrusions partially overlap with each other.

5. The tire according to claim 2, wherein among the character protrusions, the character protrusions adjacent to each other and having the character protrusion regions partially overlapping with each other delineate a same character.

6. The tire according to claim 1, wherein the character protrusions each include a plurality of bent portions.

7. The tire according to claim 6, wherein the character protrusion regions of three or more adjacent character protrusions partially overlap with each other.

8. The tire according to claim 6, wherein among the character protrusions, the character protrusions adjacent to each other and having the character protrusion regions partially overlapping with each other delineate a same character.

9. The tire according to claim 1, wherein the character protrusion regions of adjacent three or more of the character protrusions partially overlap with each other.

10. The tire according to claim 9, wherein among the character protrusions, the character protrusions adjacent to each other and having the character protrusion regions partially overlapping with each other delineate a same character.

11. The tire according to claim 1, wherein among the character protrusions, those adjacent to each other and having the character protrusion regions partially overlapping with each other delineate a same character.

12. The tire according to claim 1, wherein each character protrusion has a protruding height (H) of 0.5 mm or greater and 1.0 mm or less.

13. The tire according to claim 1, wherein a minimum distance(S) between the plurality of character protrusions is 0.1 mm or greater and 0.3 mm or less.

* * * * *